United States Patent [19]

Nishimoto et al.

[11] Patent Number: 5,374,673
[45] Date of Patent: Dec. 20, 1994

[54] FLAME-RETARDANT RESIN COMPOSITION

[75] Inventors: Kenji Nishimoto, Hyogo; Yoshihiko Hashimoto, Osaka, both of Japan

[73] Assignee: Kanegafuchi Kagaku Kogyo Kabushiki Kaisha, Osaka, Japan

[21] Appl. No.: 45,947

[22] Filed: Apr. 15, 1993

[30] Foreign Application Priority Data

Apr. 21, 1992 [JP] Japan ................................ 4-129474

[51] Int. Cl.⁵ .............................................. C08K 5/56
[52] U.S. Cl. .................................. 524/178; 524/399; 525/239
[58] Field of Search ................ 525/239; 524/399, 180, 524/178

[56] References Cited

U.S. PATENT DOCUMENTS

| | | | |
|---|---|---|---|
| 3,367,997 | 2/1968 | Smith | 524/180 |
| 3,644,589 | 2/1972 | Moore et al. | 524/180 |
| 3,759,863 | 9/1973 | Czekay et al. | 524/180 |
| 3,862,066 | 1/1975 | Reiter et al. | 524/178 |
| 4,008,295 | 2/1977 | Koshida et al. | 260/876 R |
| 4,089,912 | 5/1978 | Levek et al. | 524/178 |
| 4,518,732 | 5/1985 | Bussing et al. | 524/178 |
| 4,609,701 | 9/1986 | Jones et al. | 524/178 |
| 5,118,741 | 6/1992 | Amano et al. | 524/178 |

FOREIGN PATENT DOCUMENTS

| | | |
|---|---|---|
| 386789 | 9/1990 | European Pat. Off. |
| 2532728 | 2/1976 | Germany |

OTHER PUBLICATIONS

Derwent Abstract of JP-A-3 052 941, Mar. 7, 1991.

*Primary Examiner*—Veronica P. Hoke
*Attorney, Agent, or Firm*—Armstrong, Westerman, Hattori, McLeland & Naughton

[57] ABSTRACT

A flame retardant composition which includes (A) 100 parts by weight of a flame retardant resin mixture of from 30 to 80 weight percent of a styrene series (A1) wherein the reduced viscosity of a methyl ethyl ketone-soluble component is from 0.2 to 0.55 dl/g in an N,N-dimethylformamide solution at 30° C. and a concentration of 0.3 g/dl, and from about 70 to about 20 weight percent of a vinyl chloride resin (A2) having an average polymerization degree of from 400 to 800, (B) from about 0.5 to about 6 parts by weight of a heat stabilizer, the volatile loss of which after the heating to 240° C. for one hour in air is not more than 50% by weight, and (C) from about 0.1 to about 5 parts by weight of a lubricant, the volatile loss of which after heating to 240° C. for one hour in air is not more than 50% by weight.

8 Claims, No Drawings

FLAME-RETARDANT RESIN COMPOSITION

FIELD OF THE INVENTION

The present invention relates to a flame-retardant resin composition which possesses excellent injection molding workability, and more particularly, to a flame-retardant resin composition which has excellent moldability through hot runner, does not cause black stripes and flash on the moldings, and does not give attachments to a mold. In a hot-molding machine, a runner which is a path way from a sprue to a mold cavity, is optionally heated to maintain a molding material in a flowable state so that the hot material may be used as a part of the molding material for a subsequent molding operation. A runner having a heating facility is conventionally called as "a hot-runner".

BACKGROUND OF THE INVENTION

A flame-retardant resin composed of a low molecular weight styrene series resin and a low polymerization degree vinyl chloride series resin is an excellent material in view of its mechanical properties and cost. Recently the use of the resin as housing materials for business machines and instruments has been increased. However, runner-less molding has been widely used as one of useful means from the environmental problem of plastics, etc.

However, the foregoing material has difficulties that black stripes and flash are liable to form on the molded products thereof and a molding work through hot runner is reluctant to apply. The reason is believed to be that since the material contains, in particular, a vinyl chloride series resin, the melt viscosity of the resin at injection molding is high and the fluidity thereof is low, which causes residence burning at the hot runner portion, increased shearing heating of a metal such as a screw, a cylinder, a mold, etc., and thermal decomposition of the resin, thereby causing black stripes, flash, etc., on the molded product.

For overcoming the above-described difficulties, it has generally been practiced to add a large amount of a stabilizer or a lubricant to the resin. However, these methods sometimes give large problems that the additive added during molding attach to a mold to lower productivity, and the appearance of the molded products becomes inferior, etc.

SUMMARY OF THE INVENTION

Under such circumstances, the object of the present invention is to provide a flame-retardant resin composition having a good hot runner moldability, giving molded products having a good appearance, giving no attachments to a mold, and being particularly suitable for injection molding.

That is, the present invention provides a flame-retardant resin composition comprising;

(A) 100 parts by weight of a flame-retardant resin comprising from about 30 to about 80% by weight of a styrene series resin (A1) wherein a reduced viscosity of the methyl ethyl ketone-soluble portion is from 0.2 to 0.55 dl/g (N,N-dimethylformamide solution, 30° C., concentration 0.3 g/dl) and from about 70 to about 20% by weight of a vinyl chloride series resin (A2) having an average polymerization degree of from 400 to 800, (B) from about 0.5 to about 6 parts by weight of a heat stabilizer the volatile loss of which after heating to 240° C. for one hour in air is not more than 50% by weight, and (C) from about 0.1 to about 5 parts by weight of a lubricant the volatile loss of which after heating to 240° C. for one hour in air is not more than 50% by weight.

DETAILED DESCRIPTION OF THE INVENTION

The styrene series resin (AI) in the component (A) in the present invention is a resin wherein the reduced viscosity of the methyl ethyl ketone-soluble portion in an N,N-dimethylformamide solution and at a concentration of 0.3 g/dl and a temperature of 30° C. is from 0.2 to 0.55 dl/g.

The styrene series resin includes all the ordinary styrenic resins having a good compatibility with a vinyl chloride series resin, such as an ABS resin, an AS resin, an MBS resin, an MABS resin, an acrylonitrile-butadiene-styrene-α-methylstyrene copolymer, an acrylonitrile-methyl methacrylate-butadiene-styrene-α-methylstyrene copolymer, an acrylonitrile-butadiene-styrene-α-methylstyrene-maleinimide copolymer, an AAS resin, an AES resin, a styrene-maleic anhydride copolymer, a styrene-maleinimide copolymer, etc., and they can be used singly or in combination.

If the reduced viscosity of the methyl ethyl ketone-soluble portion of the styrene series resin is less than 0.2 dl/g, the impact resistance of the flame-retardant resin is lowered. Conversely, if the reduced viscosity of the methyl ethyl ketone-soluble portion is over 0.55 dl/g, the fluidity of the flame-retardant resin composition is lowered, which reduces the thermal stability thereof during molding.

The amount of the styrene series resin (A1) in the component (A) is from about 30 to about 80% by weight, and preferably from 35 to 75% by weight.

If the amount of the styrene series resin is over about 80% by weight, the impact resistance of the flame-retardant resin composition is greatly lowered, while if the amount thereof is less than about 30% by weight, the content of the vinyl chloride series resin is relatively increased to undesirably cause the reduction of the workability of the flame-retardant resin composition.

The vinyl chloride series resin (A2) includes the homopolymer of vinyl chloride and/or a copolymer of at least 80 mol % vinyl chloride, and post-chlorinated polyvinyl chloride. The vinyl chloride copolymer may contain not more than 20% by weight a monovinylidene compound such as ethylene, vinyl acetate, methyl methacrylate, butyl acrylate, etc., as a copolymer component.

The amount of the vinyl chloride series resin (A2) in component (A) is from about 20 to about 70% by weight, and preferably from 25 to 65% by weight.

The average polymerization degree of the vinyl chloride series resin (A2) in the component (A) is from 400 to 800, and preferably from 450 to 750. If the average polymerization degree of the vinyl chloride series resin (A2) is less than 400, the impact resistance of the flame-retardant resin composition is lowered, while if the average polymerization degree is over 800, the fluidity of the flame-retardant resin composition is greatly lowered.

Component (A) is compounded with heat stabilizer (B) the volatile loss of which at heating to 240° C. for one hour in air is not more than 50% by weight and lubricant (C) showing the same volatile loss as stabilizer (B) for imparting the hot runner moldability to the flame-retardant resin composition of the present invention and giving the effects that the molded product of the flame-retardant resin composition has a good appearance and the flame-retardant resin composition does not give attachments to a mold during molding.

If the volatile loss of these components (B) and (C) is over 50% by weight, black stripes and flash will form on the molded product of the flame-retardant resin composition. In addition, volatile will attach to a mold and fill the crimp surface of the mold to reduce the appearance of the molded product. Thus, in order to obtain an unspoiled appearance of the molded product, the volatile loss of the heat stabilizer (B) and the lubricant (C) being used in the present invention must not be more than 50% by weight, and preferably not more than 40% by weight.

There are no particular restrictions on the heat stabilizer (B) and the lubricant (C) being used in the present invention if their volatile loss is within the above-described range.

The heat stabilizer (B) includes ordinary well-known tin-series stabilizers such as a dibutyltin maleate polymer, dibutyltin maleate, a dioctyltin maleate polymer, dioctyltin maleate, etc.; phosphite series stabilizers such as bis(2,4-di-t-butylphenyl)pentaerythritol diphosphite (PEP-24G, trade name, made by Asahi Denka Kogyo K.K.), bis(2,6-di-t-butyl-4-methylphenyl)pentaerythritol diphosphite (PEP-36, trade name, made by Asahi Denka Kogyo K.K.), etc.; phenol series anioxidants such as 1,3,5-triazine-2,4,6-(1H,3H,5H)trione (AO-20, trade name, made by Asahi Denka Kogyo K.K.), 1,1,3-tris(2-methyl-4-hydroxy-5-t-butylphenyl)butane (AO-30, trade name, made by Asahi Denka Kogyo K. K.), 4,4'-butylidene-bis(6-t-butyl-3-methylphenol) (AO-40, trade name, made by Asahi Denka Kogyo K.K.), etc. They can be used singly or in combination.

In addition, it is preferred that the heat stabilizer (B) being used in the present invention contains at least 50% by weight of a tin based stabilizer.

The amount of the heat stabilizer (B) is from about 0.5 to about 6 parts by weight, and preferably from 1.5 to 5 parts by weight to 100 parts by weight of the flame-retardant resin (A). If the amount of the stabilizer (B) is less than about 0.5 part by weight, the flame-retardant resin composition will have insufficient heat stability, while if the amount is over about 6 parts by weight, the impact resistance of the flame-retardant resin composition will be lowered and also the cost thereof is increased.

The lubricant (C) includes metal soaps such as calcium stearate, etc.; various fatty acid esters such as stearyl stearate, behenyl behenate, glycerol tristearate, montanic acid ester, etc.; amide series lubricants such as ethylene bis-stearoamide, ethylene bis-erucic amide, etc.; and olefin waxes such as polyethylene wax, polypropylene wax, montanic acid wax, etc. They are used singly or as a mixture thereof.

The amount of the lubricant (C) is from about 0.1 to about 5 parts by weight, and preferably from 1 to 3 parts by weight to 100 parts by weight of the flame-retardant resin (A).

If the amount of the lubricant (C) is less than about 0.1 part by weight, the heat stability of the flame-retardant resin composition of the present invention will be insufficient and if the amount is over about 5 parts by weight, the releasing property of the molded product from the mold and also the impact resistance of the molded product are greatly lowered.

Furthermore, if necessary, the flame-retardant resin composition of the present invention can contain a UV absorbent, a pigment, an antistatic agent, etc., and further, according to the extent of requirement for the flame retardance, may properly contain a small amount of a halogen-series flame-retardant, a flame-retardant aid, such as an antimony compound.

The flame-retardant resin composition of the present invention comprising components (A), (B), and (C) can be produced by a known method.

Injection molding can be carried out using the pellets or the powder of the flame-retardant resin composition of the present invention. The pellets of the resin composition can be obtained by an ordinary extruding machine. In this case, any extruding condition may be employed if the vinyl chloride series resin is not deteriorated and there are no particular restrictions on the form of the screw of the extruding machine, the extruding temperature, the extruding speed, etc., As to the hot runner system, an external heating system is preferably used as the heating system, a valve gate system is preferably used as the gate system, and a temperature controlling system capable of obtaining a temperature control in accuracy is preferably used.

Molding systems commercially available from system makers include a valve gate system of Mold Masters K. K., a valve gate system of Nippon DME K.K., a valve gate system of Incoe Co., etc. In this case, it is more preferable to employ the valve gate system wherein the inlets to the valve gate are formed such that the molten resin composition flows in from two directions, whereby yellowing is reluctant to occur at the gate portion and good molded products are obtained. Also, a tip intermittent heating system in the external heating system and a hot runner system in an internal heating system may be used according to the form of moldings but are generally undesirable since yellowing of the vinyl chloride resin is liable to occur.

For injection molding, an ordinary injection molding machine can be used, any injection molding condition can be employed if the vinyl chloride series resin is not deteriorated, and there are no particular restrictions on the form of the screw of the injection molding machine, the injection molding temperature, speed, pressure, etc. An injection molding machine having multi-stage control is preferably used since molded products having better appearance are obtained.

The flame-retardant resin composition of the present invention has the effects or merits that the resin composition has excellent hot runner moldability, the molded products obtained therefrom have a good appearance (have neither black stripes nor flash) and the resin composition gives no attachments onto a mold during molding.

The present invention is described in more detail in the following illustrative examples. All parts in these examples, unless otherwise indicated, are by weight.

Examples 1 to 4 and Comparison Examples 1 to 3 a) Synthesis of Styrene Series Resin

By polymerizing 20 parts of acrylonitrile, 80 parts of styrene, and 20 parts of butadiene by a known emulsion polymerization method, a styrene series resin having a reduced viscosity ($\eta sp/c$) of 0.35 dl/g was obtained.

b) Vinyl Chloride Series Resin

A vinyl chloride series resin having an average polymerization degree of 590 (Kane Vinyl S600, trade name, made by Kanegafuchi Kagaku Kogyo Kabushiki Kaisha) was used.

After blending a mixture of 50 parts of the styrene series resin synthesized in a) and 50 parts of the vinyl chloride series resin in b) as the common blend with each of the heat stabilizers and each of the lubricants shown in Table 1 below by means of a super mixer, the resultant mixture was extruded into pellets by means of a 40 mm extruding machine to provide each of flame-retardant resin compositions.

The reduced viscosity of the styrene series resin was measured by the following method.

That is, the styrene series resin was dissolved in N,N-dimethylformamide such that the concentration of the methyl ethyl ketone-soluble component of the resin became 0.3 g/dl to provide a polymer solution and the passing time (t) was measured using a Ubbelohde's viscometer (capillary automatic viscometer, manufactured by Shibayama Kagaku Kiki Seisakusho K.K.) at 30° C. according to JIS K 6721. On the other hand, on the solvent, N,N-dimethylformamide, the passing time (t) at 30° C. was also measured using the same apparatus and the reduced viscosity ($\eta$red) was calculated by the following formula:

$$\eta red = (t/t_o - 1)/C$$

wherein, C is the concentration of the polymer solution.

The volatile losses of each heat stabilizer and each lubricant were measured by the following method.

In a small container made of galvanized iron having a diameter of 5 cm was placed 1 g of each heat stabilizer or each lubricant and after allowing to stand the can containing the component in an oven of 240° C. in air for one hour, the reduced weight of each component was measured. The reduced weight is shown as the volatile loss. As the numeral is larger, the volatile loss is worse. The results obtained are shown in Table 2 below. Then, by carrying out injection molding of each of the various resin compositions obtained as described above, the moldability of each composition was evaluated. The experimental apparatus used for the evaluation and the evaluation methods of the moldability are shown below.

(1) Experimental Apparatus a) Hot Runner System The hot runner system, Type MS-158-1000 (manufactured by Mold Masters K. K.), wherein the heating system was an external heating system, the gate system was an oil-pressure driving valve gate system, and the inlets to the valve gate were from two directions, was used. The gate diameter was 4 mm and the valve pin having a conical tip was used.

b) Injection Molding Machine

FANUC 150B (150 TON) (trade name, manufactured by Fanuc Co., Ltd.) was used.

c) Molding (mold)

A box-form molded product with a rib and having a weight of 120 g was molded.

(2) Evaluation of Moldings a) Appearance of Molded Product

Each molded product was injection molded at a molding temperature of 200° C. and any black stripes and flash formed on the surface of each molded product were visually observed.

In the evaluation of the appearance, the case of forming the black stripes and flash is shown by x, the case of slightly forming them is shown by ∆, and the case of not forming them is shown by o.

b) Attachment onto Mold

After molding molded products of 200 shots at a molding temperature of 200° C. the extent of the attachments on the mold was visually observed. The case of giving almost no attachment is shown by o, the case of giving attachments a little is shown by ∆, and the case of giving many attachments is shown by x.

The results obtained are shown in Table 1 below.

TABLE 1

| Example | Kind of Additives | | | | Black Stripes | Flash | Attachment onto Mold | Remarks |
|---|---|---|---|---|---|---|---|---|
| | Stabilizer (part) | | Lubricant | | | | | |
| 1 | Dibutyltin Maleate Polymer | (2) | Glycerol Tri-stearate | (1) | | | | Inventive Example |
| | Dioctyl Tin Maleate | (2) | Ethylene Bis-stearoamide | (1) | O | O | O | |
| 2 | Dibutyltin Maleate Polymer | (2) | Behenyl Behenate | (1) | | | | Inventive Example |
| | Dioctyl Tin Maleate | (2) | Ethylene Bis-stearoamide | (1) | O | O | O | |
| 3 | Dibutyltin Maleate Polymer | (1) | Behenyl Behenate | (1) | | | | Inventive Example |
| | Dioctyl Tin Maleate | (2) | Ethylene Bis-stearoamide | (1) | O | O | O | |
| | AO-20 | (0.5) | | | | | | |
| 4 | Dibutyltin Maleate Polymer | (1) | Polyethylene Wax SW171P | (1) | | | | Inventive Example |
| | Dioctyl Tin Maleate | (2) | Ethylene Bis-stearoamide | (1) | O | O | O | |
| | PEP-36 | (0.5) | | | | | | |
| 1 | Dibutyltin Maleate Polymer | (2) | Glycerol Tri-stearate | (1) | | | | Comparative Example |
| | Dibutyltin Bis(2-ethylhexyl β-mercaptopropionate) | (2) | Ethylene Bis-stearoamide | (1) | X | ∆ | O | |
| 2 | Dibutyltin Maleate Polymer | (2) | Glycerol Tri-stearate | (1) | | | | Comparative Example |
| | Dibutyltin Bis(2-ethylhexyl β-mercaptopropionate) | (2) | Fluid Paraffin | (1) | X | ∆ | X | |
| 3 | Dibutyltin Maleate Polymer | (2) | Glycerol Tri-stearate | (1) | | | | Comparative Example |

TABLE 1-continued

| Example | Kind of Additives | | | | Black Stripes | Flash | Attachment onto Mold | Remarks |
|---|---|---|---|---|---|---|---|---|
| | Stabilizer (part) | | Lubricant | | | | | |
| | Dioctyl Tin Maleate | (2) | Fluid Paraffin | (1) | X | △ | X | |

TABLE 2

Volatile Loss of heat Stabilizers and Lubricants:

| Additives | Volatile Loss (%) |
|---|---|
| (Stabilizers) | |
| Dibutyltin Maleate Polymer | 31 |
| Dioctyltin Maleate | 33 |
| AO-20 | 5 |
| PEP-36 | 36 |
| Dibutyltin Bis(2-ethylhexyl β-mercaptopropionate) | 86 |
| (Lubricants) | |
| Glycerol Stearate | 30 |
| Ethylene Bis-stearoamide | 13 |
| Behenyl Behenate | 38 |
| Polyethylene Wax SW171P | 8 |
| Fluid Paraffin | 80 |

Volatile loss condition: One hour in an oven of 240° C. in air, opening of damper 30%.

From the results shown in Table 1, it can be seen that the flame-retardant resin compositions of the present invention each using the heat stabilizer having a volatile loss of not more than 50% by weight and the lubricant having a volatile loss of not more than 50% by weight show a good hot runner moldability and give molded products each having a good appearance without giving attachments onto the mold.

What is claimed is:

1. A flame-retardant composition comprising which has excellent hot runner moldability comprising
   (A) 100 parts by weight of a flame-retardant resin comprising from about 30 to about 80% by weight of a styrene resin (A1) wherein the reduced viscosity of a methyl ethyl ketone-soluble component is from 0.2 to 0.55 dl/g in an N,N-dimethylformamide solution at 30° C. and a concentration of 0.3 g/dl and from about 70 to about 20% by weight of a vinyl chloride resin (A2) having an average polymerization degree of from 400 to 800,
   (B) from about 0.5 to about 6 parts by weight of a heat stabilizer the volatile loss of which after heating to 240° C. for one hour in air is not more than 50% by weight, and
   (C) from about 0.1 to about 5 parts by weight of a lubricant the volatile loss of which after heating to 240° C. for one hour in air is not more than 50% by weight,
   wherein said heat stablizer is at least one member selected from the group consisting of dibutylin maleate, a dibutyltin maleate polymer, dioctyltin maleate, and a dioctyltin maleate polymer, and
   wherein said lubricant is at least one member selected from the group consisting of glycerol tristearate, ethylene bis-stearoamide, behenyl behenate and polyethylene wax.

2. The flame retardant composition of claim 1, wherein the volatile loss of said heat stabilizer is not more than 40%.

3. The flame retardant composition of claim 1, wherein the volatile loss of said lubricant is not more than 40%.

4. The flame retardant composition of claim 1, wherein said styrene series resin is an acrylonitrile-butadiene-styrene copolymer.

5. The flame retardant composition of claim 1, wherein said heat stabilizer is present in an amount of from 1.5 to 5 parts by weight to 100 parts by weight of said flame retardant resin.

6. The flame retardant composition of claim 1, wherein said lubricant is present in an amount of from 1 to 3 parts by weight to 100 parts by weight of said flame retardant resin.

7. A method of injection molding a flame-retardant resin composition, comprising
   molding the flame retardant resin composition of claim 1 into a desired shape by means of an injection molding apparatus having a heated runner system.

8. The method of claim 7, wherein said heated runner system comprises an external heating system, a valve gate, and a temperature control system.

* * * * *